June 30, 1925.
W. M. McEWEN
TIRE TOOL
Filed June 23, 1921
1,543,862
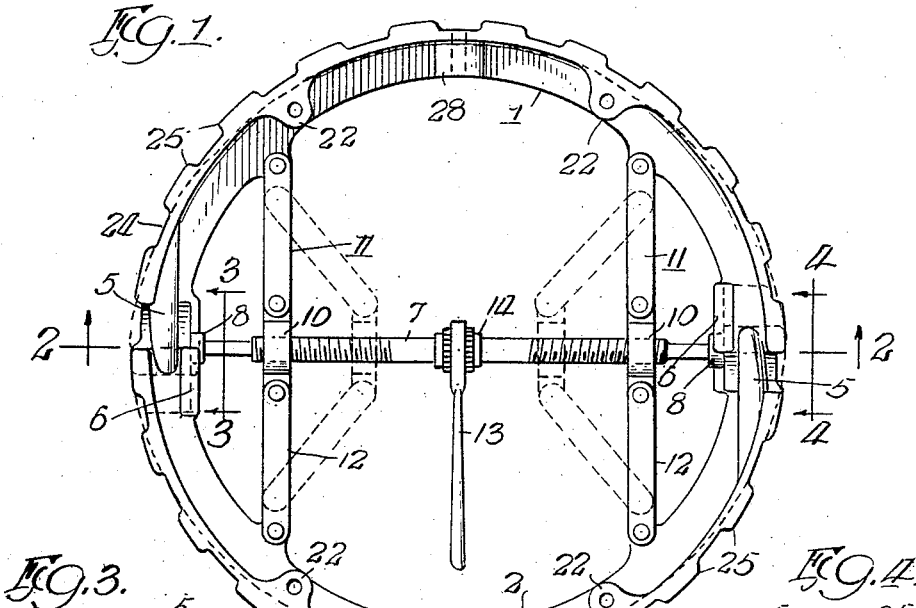
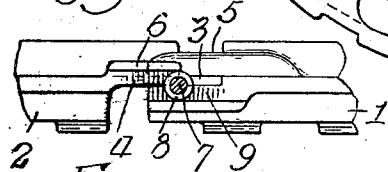
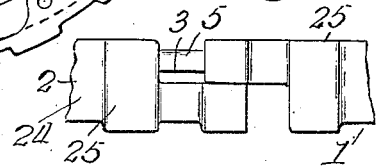
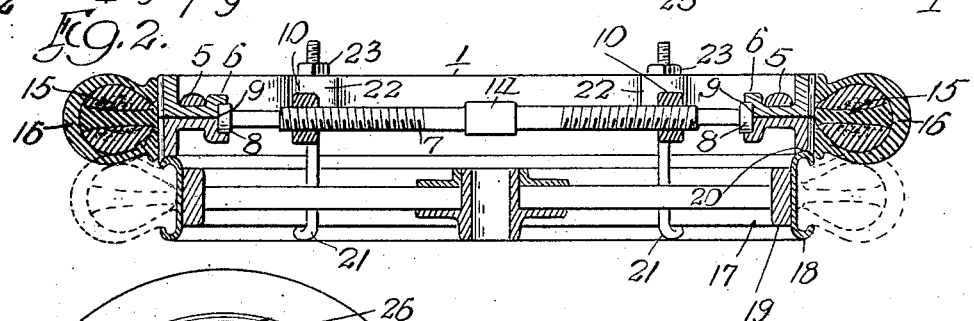
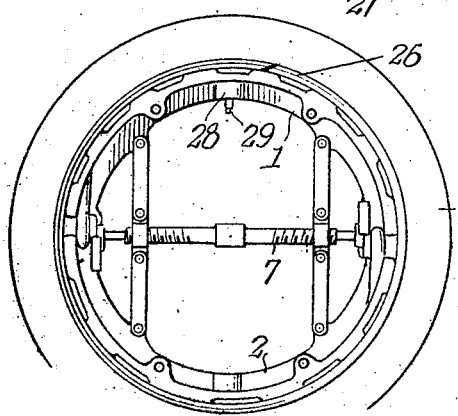
Inventor
Willard M. McEwen Patented June 30, 1925.

1,543,862

UNITED STATES PATENT OFFICE.

WILLARD M. McEWEN, OF CHICAGO, ILLINOIS.

TIRE TOOL.

Application filed June 23, 1921. Serial No. 479,731.

*To all whom it may concern:*

Be it known that I, WILLARD M. MCEWEN, a citizen of the United States, residing at Chicago, in the county of Cook and State of Illinois, have invented new and useful Improvements in Tire Tools, of which the following is a specification.

This invention relates to tire tools for mounting a tire casing on a wheel rim, or for expanding a collapsible rim into engagement with a tire casing.

The tool of my invention is especially adapted for mounting on a wheel rim an assembled tire casing and filler and more particularly a filler of the kind shown in my copending application Serial No. 364,883, filed March 11, 1920, and in the application of Frank M. Netzel, Serial No. 453,894, filed March 21, 1921. The filler in question is made annular in shape and of a size to fit within and substantially fill and hold distended the outer casing or shoe of a tire and is used in lieu of the pneumatic inner tube. The filler is composed of a plurality of strips of resilient rubber, preferably three, vulcanized together and extending circumferentially, as endless strips, about the tire, and arranged to extend radially outward from the wheel rim with one strip in the center, that is, between the other two. The center strip is made harder than the side strips so as to support the normal load on the tire and also maintain the casing properly distended radially outward to hold the clincher beads of the casing in the clincher channels of the rim. To gain the greatest degree of efficiency out of the filler when in use in a tire, it is essential that the filler be inserted in the casing in position having the center strip radially disposed and maintain that position when the assembled casing and filler is applied to the rim. Should the filler be twisted or bent in applying the parts to a rim so that the center strip is distorted or displaced in any portion from a proper radial position with respect to the rim, the load on the center strip is not evenly and properly distributed throughout its circumferential extent as it should be, and the best results not obtained. Without special care or the service of a workman who understands how to place the assembled casing and filler on a wheel rim, the filler is likely to be twisted and the center strip distorted out of proper load-supporting position, as the tire tools heretofore employed are not designed for doing this work.

The main object of my present invention is to provide a tool so constructed that an assembled casing and filler may be applied to a wheel rim with ease and dispatch without twisting or distorting the filler out of proper load-supporting position, and further enable this to be done by a car owner without the exercise of special care or skill or without calling for the services of a skilled workman.

The invention consists further in the matters hereinafter described and more particularly pointed out in the appended claims.

In the accompanying drawings—

Fig. 1 is a front view of a tool constructed in accordance with my invention;

Fig. 2 is a sectional view taken on line 2—2 of Fig. 1, and showing the tool applied to one side of a vehicle wheel;

Fig. 3 is a sectional view of a detail of construction, taken on line 3—3 of Fig. 1;

Fig. 4 is an elevational view of a detail of construction, taken on line 4—4 of Fig. 1; and Fig. 5 is a view showing the tool used for expanding a collapsible rim.

As shown in the drawings, the device of my invention comprises two substantially semicircular parts or sections 1 and 2, which when applied end to end give the tool a substantially circular shape. The meeting ends of these sections have overlapping and sliding engagement so that the tool may be expanded and contracted. This connection, as shown in Fig. 3, is made by providing one end of one of said sections, preferably the one 1, with a bifurcated end forming a slot 3 to receive a flange 4 on the meeting end of the other section 2. The slot 3 is formed in part by a tongue or rib 5 integral with the section 1 and entering a channel formed in part by a rib 6 integral with the end flange 4 on the section 2. The same type of construction is employed at the other meeting ends of the sections 1 and 2, only the elements are reversed, thereby making both of the sections 1 and 2 alike and permitting them to be cast from the same pattern.

For expanding and contracting the tool,

I provide a bolt 7 arranged within the tool and extending diametrically across the same between the meeting ends of the sections 1 and 2. This bolt has beads 8 at its ends, bearing against the overlapping portions of the sections 1 and 2 at their meeting ends, as clearly shown in Figs. 1 and 3, there being channels 9 formed at such overlapping portions to receive the beads 8 and hold the ends of the bolt 7 against lateral displacement. The side walls of the channels constitute guides for the beads. The bolt 7 has right and left-hand screw threads on opposite sides of its center and on each is a nut 10. For each nut there is pair of links 11, 12, arranged on opposite sides of the nut and having pivotal connection therewith in the manner shown in Fig. 1. The outer ends of the links are pivotally connected with the members 1 and 2, respectively.

Turning the bolt 7 in one direction straightens out the links 11 and expands the tool by moving the members 1, 2 apart, while turning the bolt in the opposite direction contracts the tool by drawing the members 1, 2 toward each other. By providing two sets of links, the power applied to expand the tool is distributed more or less evenly on both of the members 1 and 2, so that a proper expansion of the tool is gained and thus causing a more or less true circle to be produced when the tool is expanded to its fullest extent. To facilitate turning the bolt 7, I may provide a handle 13 carried by the bolt 7 and having a ratchet connection with the enlarged mid-portion 14 thereof, as indicated in Fig. 1.

The tool is used in the following manner. A tire casing filler of the kind previously mentioned, and indicated by 15 in the drawings, is inserted in the outer casing or shoe 16 of the tire. The filler is inserted in said casing in a manner to have the various strips thereof in proper radial position, and more particularly have the harder center strip arranged so that when applied to the wheel such strip will be radial and extend circumferentially about the wheel to support the normal load on the tire. After the filler has been inserted in the casing, the tool is contracted by turning the bolt 7 and while contracted is placed inside the assembled casing and filler. The tool is then expanded by turning the bolt 7 to pick up and carry the assembled casing and filler and distend the same into annular form and to a diameter sufficient to be applied over the rim of the wheel on which the tire is to be used. The tool carrying the tire is then placed against one side of the vehicle wheel 17, as shown in Fig. 2. The wheel has a clincher rim 18 fixed to the felly 19. The members 1 and 2 are provided at one side with a concave groove 20 to fit against the adjacent clincher channel of the rim 18, and the outer edge of this groove overhangs, so to speak, said clincher channel so as to center the tool on the wheel and prevent the tool from slipping out of proper position when applied thereto.

To clamp the tool to the wheel, I provide a number of clamps which, as shown in the drawings, take the form of rods 21 having hooked shaped ends to engage against the felly 19. These rods extend through bosses 22 on the members 1 and 2 and have clamp nuts 23 applied thereto for drawing the tool tightly against the rim 18. When the parts are thus positioned, it will be noted that the diameter of the tool is substantially equal to that of the clincher channel against which the tool is held, and the assembled casing 16 and filler 15 may then be slipped over said clincher channel and into the rim without exerting a great deal of force except that sufficient to move the assembled members off of the tool and into the rim. This may be done without twisting or distorting the filler 15, and thus when the tire is in the rim and its clincher beads locked in the clincher channels, the center strip of the filler will be radially arranged and in proper position to extend circumferentially about the tire and support the normal load thereon as required.

To facilitate slipping or moving the assembled casing 16 and filler 15 into the rim from the tool, the outer surface of the tool is provided with a plurality of transverse recesses 24 and lugs 25. The outer surface of these lugs is inclined inward toward the clincher rim 18 and the bottom surfaces of the recesses 24 are inclined in the same direction but not at the same angle. These channels 24 permit a suitable implement, such as a chisel, to be inserted under the tire casing at several points around the circumference for the purpose of aiding in sliding the tire casing and its filler into the clincher channel 18, and by having the bottom surfaces of the recesses 24 inclined sufficient leverage may be had in this use.

In Fig. 5, I have shown the tire tool of my invention utilized for expanding a split or collapsible rim into engagement with a tire casing. This is done by placing the tool when contracted inside of the split rim 26 while the ends thereof are disconnected. The tool is expanded to expand the rim into tight contact with the tire casing and to cause the ends of the rim to be interlocked, as is the case in connection with rims of this kind. Each part 1, 2 of the tool has a boss 28 through which extends a hole to receive the stem 29 of the inflating valve, when that is retained.

While I have shown and described in detail a tire tool embodying the features of my invention, it is of course to be understood that the details of construction and arrangement of parts may be variously changed and modified without departing from the spirit and scope of my invention.

The bolt 7 by having its ends 8, 8 in the channels 9 and engaging both of the arcuate members 1, 2, is not only held from lateral displacement and retained in a uniform position, but holds the meeting ends of said members 1, 2 from hinging or pivoting about each other when power is applied to expand the tool. This causes both members or sections 1, 2 to move together and thus start at the same time, with the result that the tire casing is expanded equally all around.

I claim as my invention:

1. A tire tool of the character described, comprising a pair of arcuate members arranged end to end and adapted to be moved toward and from each other for varying the diameter of the tool in the direction in which the members are movable, and means located in the space formed by said members and engaged with both for moving them toward and from each other, said means engaging said members at a plurality of spaced points in the circumferential length of each for simultaneously applying substantially the same amount of power against said members at said points when moving them from each other.

2. A tire tool of the character described, comprising a pair of arcuate members arranged end to end and adapted to be moved toward and from each other for varying the diameter of the tool in the direction in which the members are movable, means located in the space formed by said members and engaged with both for moving them toward and from each other, said means engaging said members at a plurality of spaced points in the circumferential length of each for simultaneously applying substantially the same amount of power against said members at said points when moving them from each other, and means at the ends of said members for guiding the same when moved and holding them in endwise alignment.

3. A tire tool of the character described, comprising a pair of arcuate members arranged end to end and adapted to be moved toward and from each other for varying the diameter of the tool in the direction in which said members are movable, a bolt extending diametrically across said tool between the ends of said members, said bolt having right and left-hand screw threads on opposite sides of its center, nuts on said screw threads and adapted to travel lengthwise thereof on turning said bolt, and means connecting said nuts with said members whereby said members will be moved toward and from each other on turning said bolt.

4. A tire tool of the character described, comprising a pair of arcuate members arranged end to end and having their meeting ends overlapping in sliding engagement, a bolt extending diametrically across said tool between the meeting ends of said members and engaging the same, said bolt having right and left-hand screw threads on opposite sides of its center, nuts on said screw threads and adapted to travel lengthwise thereof on turning said bolt, and links extending between said nuts and said members and pivoted to both for varying the diameter of the tool by moving said members toward and from each other on turning said bolt.

5. A tire tool of the character described, comprising a pair of arcuate members arranged end to end and having a tongue and slot connection at their meeting ends, a bolt extending diametrically across said tool between the meeting ends of said members and engaging the same in channels in said members, said bolt having right and left-hand screw threads on opposite sides of its center, nuts on said screw threads and adapted to travel lengthwise thereof on turning said bolt, and links extending between said nuts and said members and pivoted to both for varying the diameter of the tool by moving said members toward and from each other on turning said bolt.

6. A tire tool of the character described, comprising a plurality of arcuate members arranged end to end and adapted to be moved toward and from each other for varying the diameter of the tool in the direction said members are movable, and means carried by the tool for moving said members toward and from each other, said members having a plurality of transverse, circumferentially spaced recesses in the outer curved surfaces thereof to permit an instrument to be inserted under a tire carried by the tool for prying the tire off the same.

7. A tire tool of the character described, comprising a plurality of arcuate members arranged end to end and adapted to be moved toward and from each other for varying the diameter of the tool in the direction said members are movable, and means carried by the tool for moving said members toward and from each other, said members being provided with a plurality of transverse, circumferentially spaced recesses in the outer curved surfaces thereof to permit an instrument to be inserted under a tire on the tool for prying the tire off the same; the outer surfaces of said recesses being inclined downward toward the side of the tool over which the tire is pried.

8. A tire tool of the character described, comprising a pair of arcuate members arranged end to end and having their meeting ends overlapping in sliding engagement, means carried by the tool in the space formed by said members and engaged with both for varying the diameter of said tool by moving said members toward and from each other, said members having at one side thereof an annular flange to fit over and around one of the clincher channels of tire rim when the tool is expanded to the diameter of said rim and applied against the same, and means carried by said members for clamping the same against the rim when sliding the expanded tire from the tool onto said rim.

In testimony that I claim the foregoing as my invention, I affix my signature this 21st day of June, A. D. 1921.

WILLARD M. McEWEN.